United States Patent [19]
Saga et al.

[11] Patent Number: 5,448,432
[45] Date of Patent: Sep. 5, 1995

[54] MAGNETIC WRITING/READING APPARATUS HAVING A HOLDER FOR A TAPE-CASSETTE WOUND ON REELS AND HAVING A FORCE GENERATING MECHANISM FOR ENSURING THE LOADING CONDITION OF THE CASSETTE IN THE APPARATUS

[75] Inventors: Hideaki Saga, Fussa; Yoh Kamei, Kokubunji; Nobuki Matsui, Musashino, all of Japan

[73] Assignee: Teac Corporation, Tokyo, Japan

[21] Appl. No.: 180,430

[22] Filed: Jan. 12, 1994

[30] Foreign Application Priority Data

Sep. 30, 1993 [JP] Japan .................................. 5-245388

[51] Int. Cl.6 .................................................. G11B 5/008
[52] U.S. Cl. .................................................. 360/96.5
[58] Field of Search .................................................. 360/96.5

[56] References Cited

U.S. PATENT DOCUMENTS 5,272,579 12/1993 Ohkubo et al. .................... 360/96.5
5,315,462 5/1994 Ohkubo et al. .................... 360/96.5

FOREIGN PATENT DOCUMENTS 5-144125 6/1993 Japan .

Primary Examiner—John H. Wolff
Attorney, Agent, or Firm—Michael N. Meller

[57] ABSTRACT

A magnetic writing/reading apparatus is provided with a holder which holds a cassette containing a magnetic tape, the cassette being inserted into the holder. A locking mechanism locks the cassette at a predetermined position in the holder when the cassette is to be loaded in the magnetic writing/reading apparatus, the locking mechanism being released when the cassette is to be ejected from the magnetic writing/reading apparatus. Also provided with is a carrying mechanism for carrying the holder holding the cassette so that the cassette is loaded in the magnetic writing/reading apparatus, the carrying mechanism which carries the holder holding the cassette causing the holder to be returned to a position at which the cassette has been initially inserted into the holder. Further, provided is a force generating mechanism for generating a force while the cassette is loaded in the magnetic writing/reading apparatus, the force generated then being applied to the cassette appropriately so that maintenance of the loading state of the cassette and a suitable writing/reading operation using the magnetic tape in the magnetic writing/reading apparatus are ensured.

6 Claims, 13 Drawing Sheets

MAGNETIC WRITING/READING APPARATUS HAVING A HOLDER FOR A TAPE-CASSETTE WOUND ON REELS AND HAVING A FORCE GENERATING MECHANISM FOR ENSURING THE LOADING CONDITION OF THE CASSETTE IN THE APPARATUS

BACKGROUND OF THE INVENTION

The present invention relates to a magnetic writing/reading apparatus for writing data on a magnetic tape contained in a tape cassette and reading data from the magnetic tape. The present invention in particular relates to a magnetic writing/reading apparatus used as a so-called streaming tape drive or streamer described below.

Such a streamer is used as an auxiliary information-storing device for backing up a main information-storing device such as a hard disc drive employed in a computer system. A magnetic tape is employed in such an information storing device as the streamer. The magnetic tape is contained in a tape cassette and wound on a pair of tape reels. The tape cassette further contains a driving roller linked with the tape reels. The roller is driven while the tape cassette is loaded in the device so that the magnetic tape runs as a result of the reels being driven by the driven driving roller. As a result, an arbitrary part of the magnetic tape may be accessed in a data writing/reading operation of the information storing device.

In such a kind of information storing device, an idler roller is provided for driving the above driving roller in the tape cassette while the idler roller is pressed onto the driving roller. The idler roller is driven by a motor, rotation of which is controlled by a servomechanism using a signal, a frequency of which is proportional to the rotation speed of the motor.

The present applicant propoes a new type of a magnetic writing/reading apparatus preferably for use with a tape cassette in a tape driving mechanism having a rotary magnetic head.

An example of a prior art magnetic writing/reading apparatus having a rotary magnetic head instead of a fixed head is taught in Japanese patent application No. 4-2286370 will now be described with reference to FIG. 1. FIG. 1 shows a plan view of this example of the magnetic writing/reading apparatus. A magnetic writing/reading apparatus 11 operates with a suitable type of a tape cassette 12 to be loaded therein. The magnetic writing/reading apparatus 11 has an arrangement as generally described below. The apparatus 11 comprises a tape driving mechanism 13, a rotary magnetic head 14, and a loading mechanism not shown in FIG. 1. The magnetic head 14 is rotated by means of a head motor 14a. The loading mechanism is used for loading the tape cassette 12. The tape driving mechanism 13 has a construction in which a wheel 15a mounted on a shaft of an idler-driving motor 15 is linked with an idler roller 18 through a belt 18a. While the tape cassette 12 is loaded in the device, the rotation of the idler roller 18 causes a magnetic tape 12a contained in the tape cassette 12 to run. This is because the idler roller 18 comes in contact with a driving roller 20, provided in the tape cassette 12, while the cassette 12 is loaded in the apparatus, the rotation of the driving roller 20 resulting in running of the magnetic tape 12a as described below.

Guidance grooves 19a and 19b are respectively formed in side walls of the tape cassette 12 as shown in FIGS. 1, 2A and 2B.

FIGS. 2A and 2B show perspective views of the front part of the tape cassette 12, and FIGS. 3A and 3B show a plan view and a front elevational view thereof respectively. In FIG. 3A, even the internal construction is indicated, by solid lines to make it easier to understand the following description thereof. The tape cassette 12 comprises a box-shape housing 21 as shown in the drawings. The above guidance grooves 19a and 19b formed in the side walls of the cassette are used for guiding a direction along which the cassette is inserted into the magnetic writing/reading apparatus 11. Locking cutouts 19c and 19d are formed at the bottom edges of the grooves 19a and 19b respectively. The locking cutouts 19c and 19d are used for locking the cassette 12 in the loaded position in the magnetic writing/reading apparatus 11. An opening 22 is formed in the front wall of the cassette 12, which opening 22 is exposed by opening a lid 23 which closes the opening 22. The lid is hinged so as to be movable to open and close the opening 22. The lid 23 is opened in response to the insertion of the cassette 12. Another opening 24 is formed in the front wall of the cassette 12, which opening 24 is adjacent to the above opening 22. This opening 24 exposes the above driving roller 20 which is rotatably supported on a top plate 21a of the housing 21 as shown in FIGS. 2A, 2B and 3B.

The lid 23 closes the opening 22 while the cassette 12 is not loaded in the magnetic writing/reading apparatus 11. The lid 23 accordingly protects the internal components of the cassette 12, the components including the magnetic tape 12a. The above rotary magnetic head 14 is inserted in the opening 22 so as to make the head access the tape 12a. When the cassette 12 is loaded into the magnetic writing/reading apparatus 11, the lid 23 rotates in a direction shown by an arrow R in FIG. 2B so as to expose the opening 22 and as a result expose the magnetic tape 12a, as described below.

A pair of reels 25 and 26 are respectively rotatably supported in the housing 21 and the magnetic tape 12a is wound on the reels 25 and 26 as shown in FIG. 3A. Further, in the housing 21 of the tape cassette 12, a driving belt 29 is wound on and extends among guidance rollers 27 and 28 and the above driving roller 20. The driving roller 20 is provided at the front side of the housing 21 while the guidance rollers 27 and 28 are provided at the rear side of the housing 21 as shown in FIG. 3A. Further, the driving belt 29 is guided so that the belt 29 is pressed onto the peripheral surface of the magnetic tape 12a wound on the reels 25 and 26 as shown in FIG. 3A. In this arrangement, the driving belt 29 rotates as a result of being driven by the rotating driving roller 20 and, as a result, drives the reels 25 and 26 in a predetermined tape winding direction.

The loading into and ejecting from the magnetic writing/reading apparatus 11 of the cassette 12 are performed manually. In the loading operation, the cassette 12 is manually inserted into the magnetic writing/reading apparatus 11 while the guidance grooves 19a and 19b are fitted into respective guidance plates 16a and 16b provided in the apparatus 11. The ejecting operation is performed so that the cassette 12 is either directly withdrawn from the apparatus 11 manually or pushed out through an ejection mechanism, manual pressing of an ejecting button driving the ejection mechanism.

Problems may occur in the use of such a magnetic writing/reading apparatus as the above apparatus 11, which problems are described below. In the apparatus, the loading and ejecting operations are performed in a substantially manual manner as mentioned above, these operations being performable without regard to which sort of operation is being performed in the magnetic writing/reading apparatus. That is, the loading and ejecting operations can be performed even though the magnetic writing/reading apparatus is in a state in which data is written into or read from a magnetic tape. As a result, the apparatus and/or data stored in the magnetic tape may be damaged.

Further, if the magnetic writing/reading apparatus has an arrangement for manually withdrawing the loaded cassette so as to eject it, a part of the loaded cassette has to be projected from the apparatus, this projected part being grasped by hand when the cassette is being withdrawn from the apparatus. In such an arrangement, some sorts of dust present outside, for example, may badly influence the apparatus and/or the cassette.

SUMMARY OF THE INVENTION

An object of the present invention is to provide a magnetic writing/reading apparatus in which the loading and ejecting of a tape cassette is performed actively by itself and the cassette is made surely loaded threrein.

To achieve the above object of the present invention, a magnetic writing/reading apparatus according to the present invention comprises:

a holder for holding a cassette containing a magnetic tape, said cassette being inserted into said holder;

locking means for locking said cassette at a predetermined position in said holder when said cassette is to be loaded in said magnetic writing/reading apparatus, said locking means being released when said cassette is to be ejected from said magnetic writing/reading apparatus;

carrying means for carrying said holder holding said cassette so that said cassette is loaded in said magnetic writing/reading apparatus, said carrying means which carries said holder holding said cassette causing said holder to be returned to a position at which said cassette has been inserted into said holder; and force generating means for generating a force while said cassette is loaded in said magnetic writing/reading apparatus, said generated force then being applied to said cassette appropriately so that maintenance of the loading state of said cassette and a suitable writing/reading operation using said magnetic tape in said magnetic writing/reading apparatus are ensured.

In the above arrangement, because the carrying means is provided, it is possible to provide a function of automatic loading/ejecting of the cassette in/from the apparatus. In this automatic loading/ejecting operation, the holder holding the cassette is automatically moved into the apparatus to be loaded therein.

Further, provision of the force generating means ensures that the cassette is held at the predetermined position for the suitable data writing/reading operation. This provision also ensures that the tape driving means of the apparatus comes into contact with the power transfer means of the cassette so it is ensured that the tape driving means drives the tape reels of the cassette via the power transfer means. Thus, the magnetic tape contained in the cassette is stably driven.

Further, since the force generating means ensures that the cassette is loaded in the apparatus, it is possible to prevent any part of the cassette from projecting outside the apparatus. Such prevention will prevent the cassette from being erroneously ejected (by it being withdrawn by the operator) while the cassette is operating in the apparatus. Further, since it is also possible to provide lid means which opens and closes as appropriate in response to a position of the holder, the apparatus and cassette may be protected from being contaminated by external dust.

Other objects and further features of the present invention will become more apparent from the following detailed description when read in conjunction with the accompanying drawings.

DESCRIPTION OF THE PREFERRED EMBODIMENT

Figure 1:
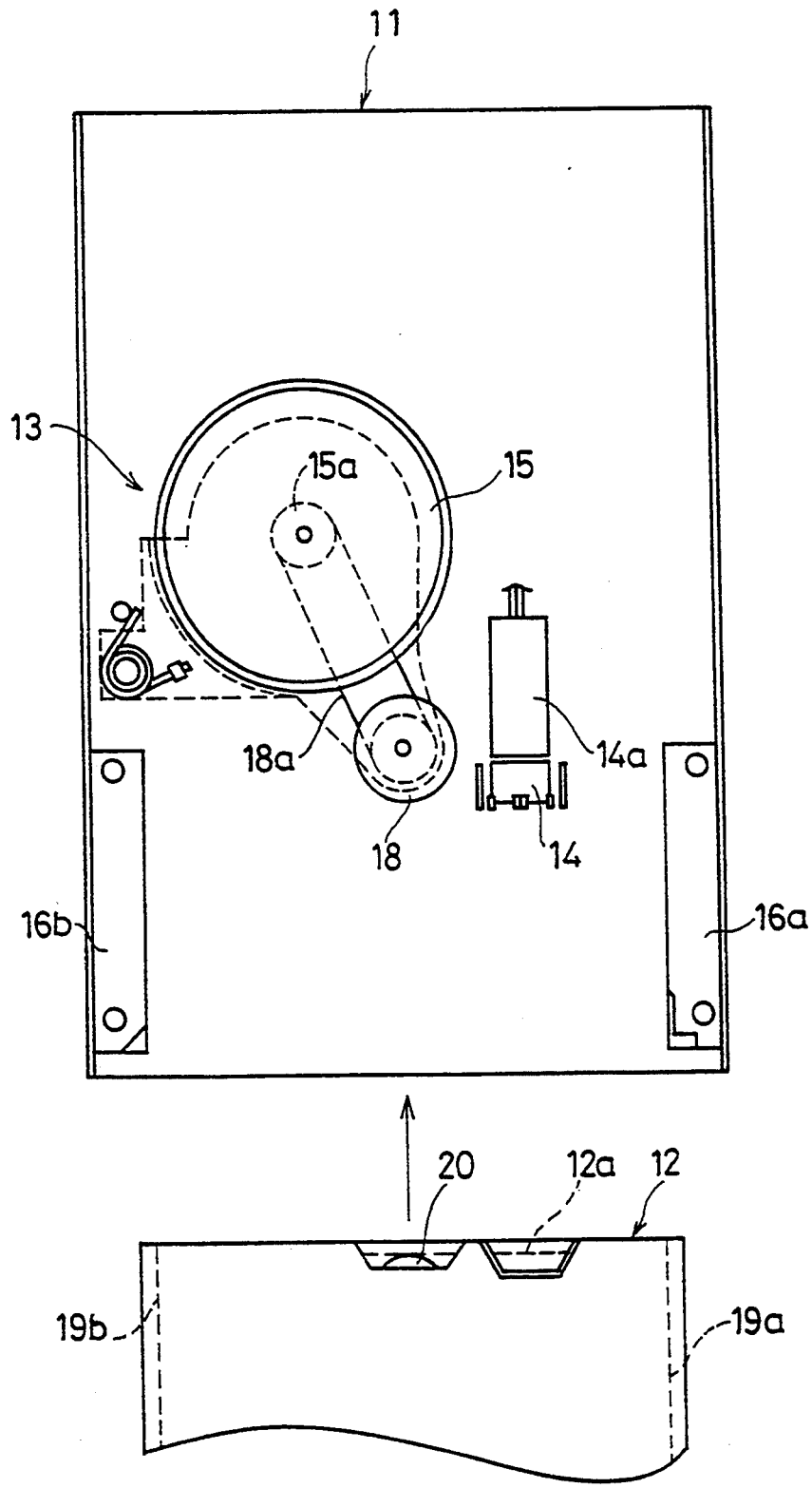
FIG. 1 shows an internal plan view of a tape driving mechanism in the related art.
Figure 4:
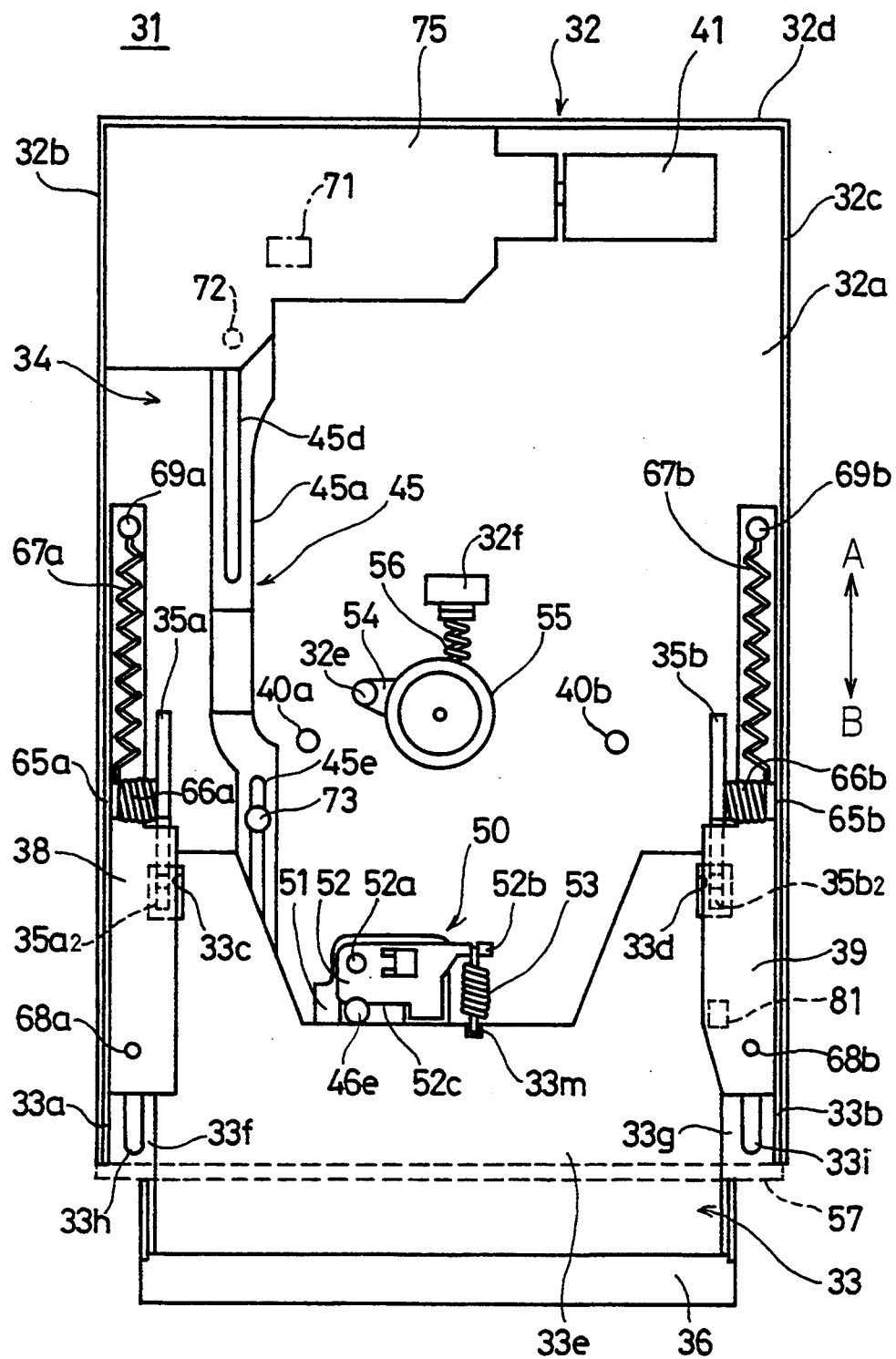
FIG. 4 shows an internal plan view of one embodiment of a magnetic writing/reading apparatus according to the present invention.

One embodiment of a magnetic writing/reading apparatus according to the present invention will now be described with reference to FIGS. 4 and 5. In FIG. 4, a magnetic wiring/reading apparatus 31 comprises a tray 33 acting as a holder, a loading mechanism 34 acting as carrying means, hooks 35a and 35b acting as locking means, a force generating mechanism 50 and lid 36. Each component is contained in a body 32. The tape cassette 12 is inserted through an opening 36a shown in FIG. 15A which is exposed as a result of the lid 36 being opened. Similarly to the apparatus of FIG. 1, the apparatus 31 further comprises a rotary head (not shown in FIG. 4) such as the rotary magnetic head 14 provided in the apparatus of FIG. 1.

The tape cassette to be used in the apparatus 31 is that shown in FIGS. 2A, 2B, 3A and 3B, in which cassette the magnetic tape 12a, a recording medium having the shape of a tape, is wound on the reels.

Figure 5:
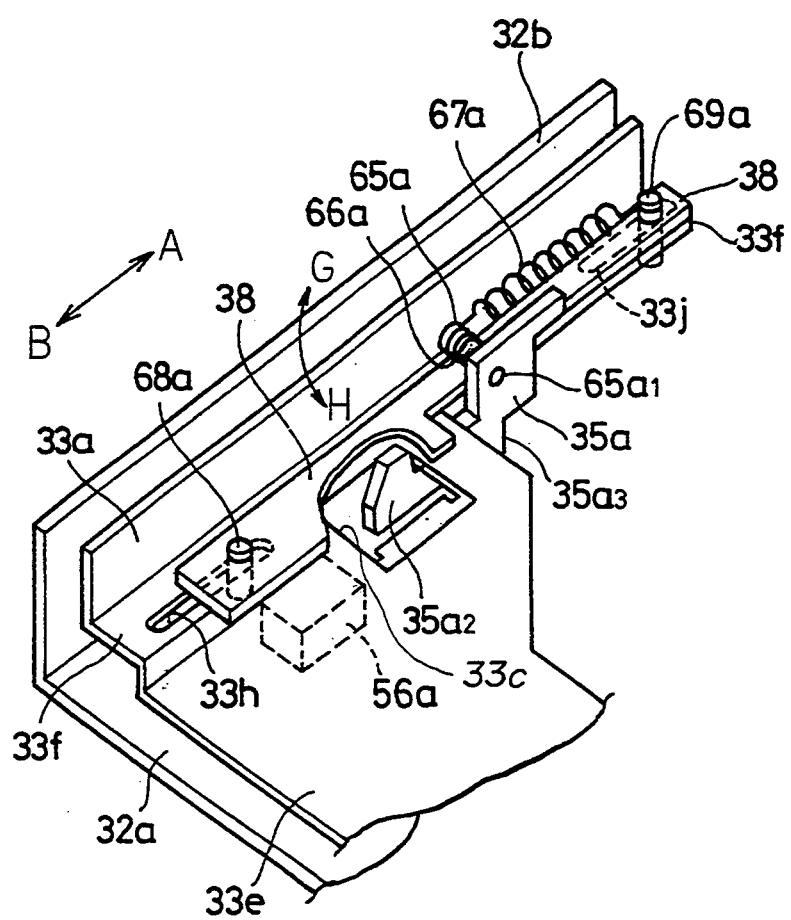
FIG. 5 shows a magnified internal perspective view of a tray and a hook used in the apparatus of FIG. 4.

As shown in FIGS. 4 and 5, the body 32 has a shape of a box formed with a base 32a, side walls 32b and 32c and a rear wall 32d. The tray 33 is formed with a bottom plate 33e and edges 33f and 33g which are provided on both sides of the bottom plate 33e and have heights slightly higher than the bottom plate 33e so that a step is formed between the bottom plate 33e and each of the edges 33f and 33g. Side walls 33a and 33b are formed on both sides of the edges 33f and 33g to extend upward. The edges 33f and 33g and side walls 33a and 33b are integrated with the bottom plate 33e.

Guide plates 38 and 39 are fixed, above the edges 33f and 33g of the tray 33, onto the base 32a through columns 68a, 69a, 68b and 69b. Elongated holes 33h, 33i, 33j, and 33k (but the hole 33k is not shown in the drawings) are formed on the edges 33f and 33g of the tray 33. The above-mentioned columns 68a, 69a, 68b and 69b pass through the corresponding respective elongated holes 33h, 33h, 33i and 33k as shown in FIG. 5. The cooperative operations between the respective elongated holes 33h–33k and the respective columns 68a–69b enable the tray 33 to slide along the directions A and B with respect to the base 32a.

Shafts 65a and 65b project inward from the respective side walls 33a and 33b and an end of each of coil springs 67a and 67b is supported by a respective one of the shafts 65a and 65b. The remaining end of each of the coil springs 67a and 67b is supported by a respective one of the columns 69a and 69b. The length of each of the coil spring 67a and 67b tends to be shortened due to its elastic property. This function of the coil springs 67a and 67b causes the tray 33 to be pulled along the direction A with respect to the body 32.

A construction of the hook 35a will now be described with reference to FIG. 5. A construction of the hook 35b, opposite to the hook 35a and located on the opposite side of the apparatus 31, as shown in FIG. 4, is similar to that of the hook 35a, and thus a description of the hook 35b (given later) is omitted here.

Figure 13A:
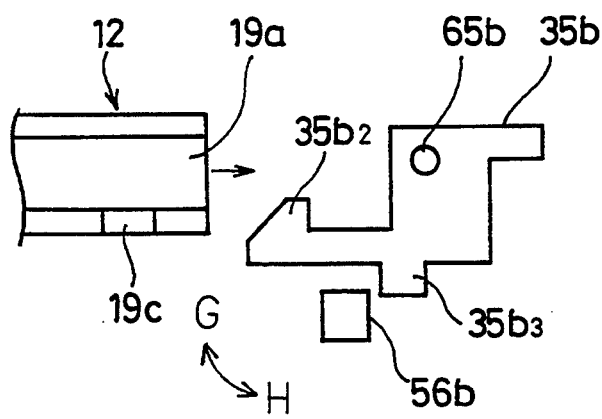
FIGS. 13A, 13B and 13C illustrate a mechanism for locking the cassette when the cassette is inserted into a tray in the apparatus of FIG. 4.
Figure 13B:
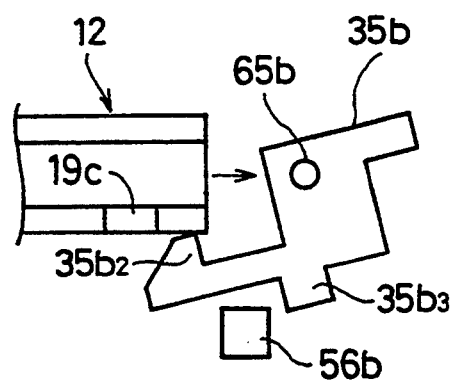
Figure 13C:
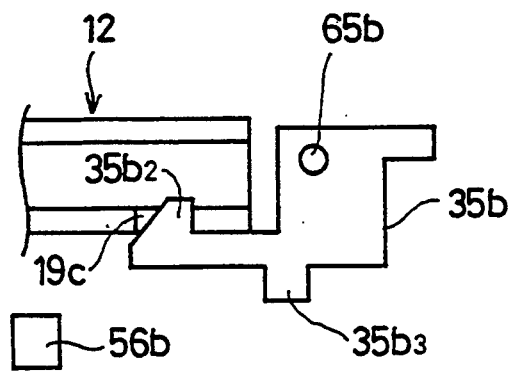

The hook 35a is rotatably supported on an inner end 65a₁ of the shaft 65a, the shaft 65a thus acting as the rotational axis of the hook 35a. A nail 35a₂, formed on the front end of the hook 35a, has an approximately triangular shape similar to a shape of a nail 35b₂ shown in FIG. 13A. The top of the nail 35a₂ projects from a hole 33c (a hole 33d in the case of the hook 35b) to be inserted into the locking cutout 19d of the tape cassette 12; similarly, the top of a nail 35b₂ is inserted into the locking cutout 19c of the cassette 12, as shown in FIG. 13c. A projection 35a₃ is formed at the bottom of the hook 35a; similarly a projection 35b₃ is formed at the bottom of the hook 35b as shown in FIG. 13A. An end of a coil spring 66a is fixed to the shaft 65a, the other end of the spring 66a being supported by the hook 35a. This coil spring 66a applies a force to the hook 35a so as to rotate it in the direction G (approximate upward direction) shown in FIG. 5. A stopper 56a (56b in the case of the hook 35b) is mounted onto the body 32 below the tray 33, the stopper 56a controlling downward rotation (in the direction H of FIG. 5) of the hook 35a.

As shown in FIG. 4, an idler roller 55 is provided approximately in the middle of the base 32a, the idler roller 55 driving the driving roller 20 of the tape cassette 12. The idler roller 55 is rotatably supported on a movable base 54 by a rotational-axis shaft located at the center of the roller 55, the roller 55 being rotatably supported on the base 32a by a rotational-axis shaft 32e. An end of a spring 56 is supported by a supporting portion 32f on the base 32a, the other end of the spring 56 being supported by the movable base 54. The spring 56, due to its elastic property, pushes the movable base 54 along the direction B with respect to the base 32a. The idler roller 55 is linked via a timing belt (not shown in the drawings) to a driving motor (not shown in the drawings), the idler roller 55 being driven to be rotated by the driving motor.

Pins 40a and 40b, for positioning the tape cassette 12 with respect to the body 32, are provided on the base 32a as shown in FIG. 4.

Figure 15A:
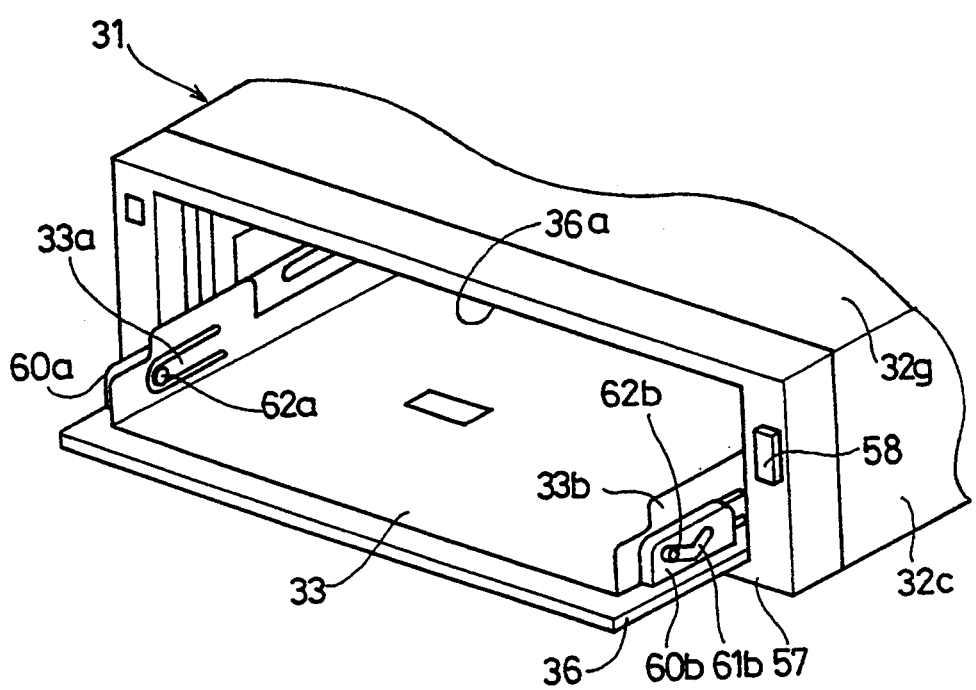
FIGS. 15A and 15B show a magnified front perspective view and a front elevation view of an insertion opening provided in the apparatus of FIG. 4.

A top plate 32g, shown in FIG. 15A, is fixed to the top of the respective side walls 32b and 32c and rear wall 32d. A cassette insertion detecting switch 81, located at the appropriate right front of the body 32 and indicated by the dash line in FIG. 4 and a cassette holding detecting switch (not shown in the drawings) are provided so as to project downward from the bottom surface of the top plate 32g. The cassette insertion detecting switch 81 is located approximately at the front and top of a guiding plate 39 and the cassette holding detecting switch is located approximately at the top of the nail 35b₂ of the hook 35b. A kind of a microswitch (trade name), for example, can be employed for activating the cassette insertion detecting switch 81 and the cassette holding detecting switch.

The above-mentioned loading mechanism 34 will now be described with reference to FIGS. 6 and 7.

Figure 6:
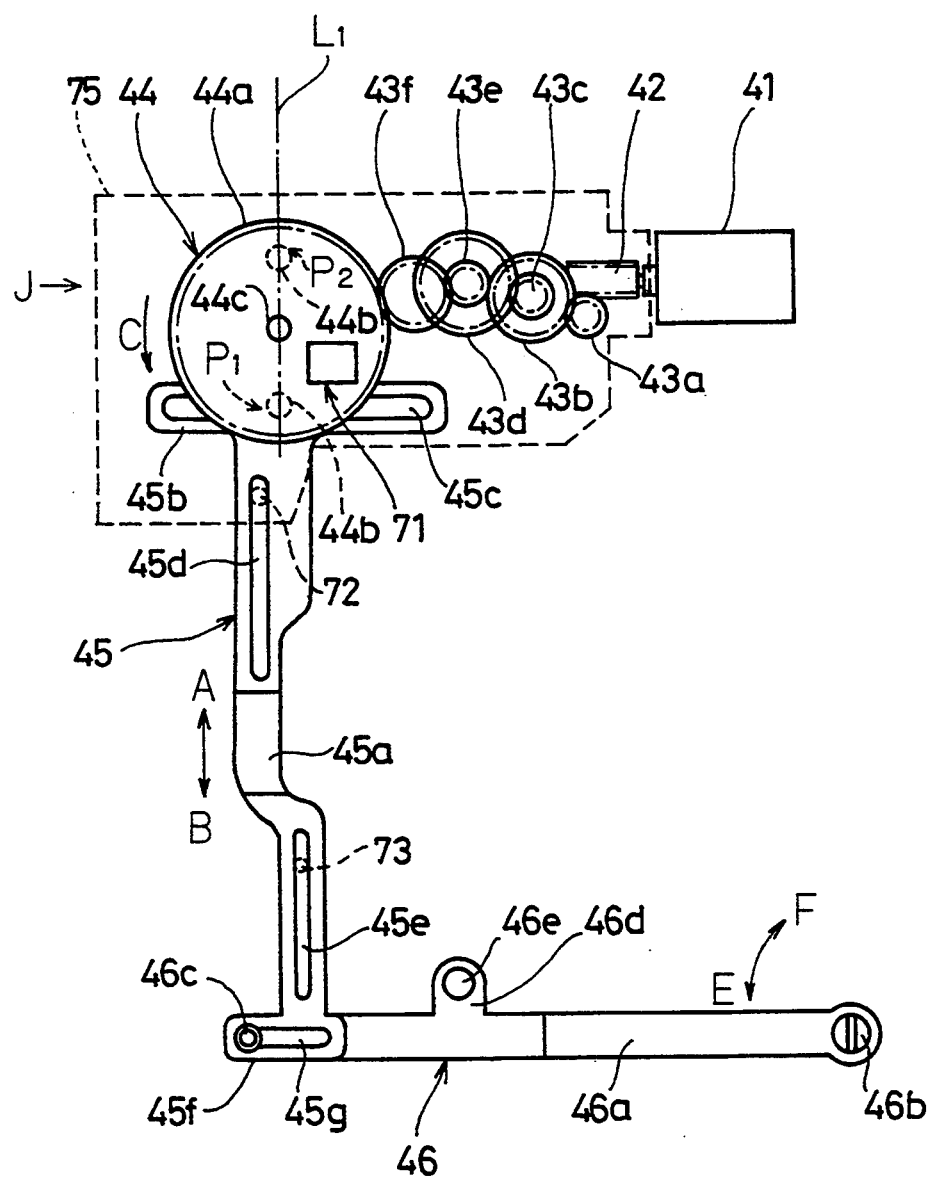
FIG. 6 shows a plan view of a loading mechanism used in the apparatus of FIG. 4.
Figure 7:
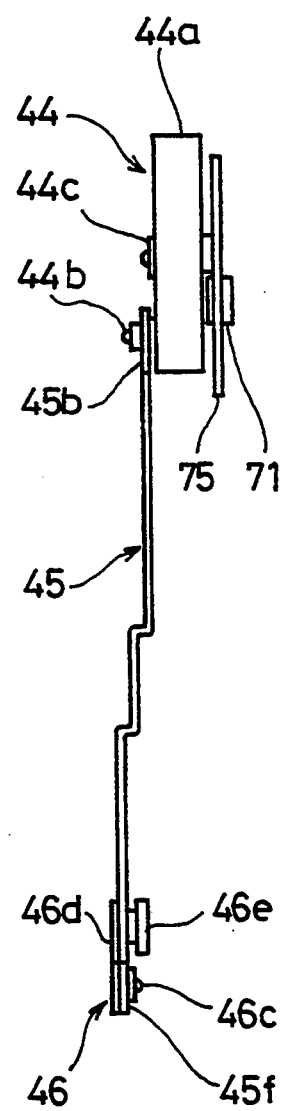
FIG. 7 shows a side elevation view of the mechanism of FIG. 6 viewed along a direction J thereof.

In FIG. 6, a worm gear 42 is fixed on a shaft of a motor 41 mounted on the base 32a, the worm gear 42 engaging an adjacent gear 43a. The gear 43a then engages an adjacent gear 43b, the gear 43b having on the bottom thereof a coaxial and smaller-diameter gear 43c. The gear 43b then engages an adjacent gear 43d, the gear 43d having on the top thereof a coaxial and smaller-diameter gear 43e. The gear 43e then engages an adjacent gear 43f. The gear 43f then engages an adjacent gear 44a which is provided on the peripheral of a cam 44. A driving pin 44b projects downward from the bottom surface of the cam 44 which is rotatably supported by a rotational-axis shaft 44c on the bottom surface of a gear base 75 as shown in FIG. 7.

Further, the gears 43a, 43b, 43c, 43d, and 43e and 43f are also rotatably supported on the bottom surface of the gear base 75, which is fixed onto the body 32. A sensor 71 described below is provided on the bottom surface of the gear base 75, the sensor 71 opposing the top surface of the cam 44 as shown in FIG. 7.

A link 45 is provided, comprising an arm 45a, to the rear end of which arm a guiding portion 45b is formed, a guiding hole 45c being formed in the guiding portion 45b, as shown in FIG. 6. The above-mentioned driving pin 44b of the cam 44 is inserted into the guiding hole 45c. Guiding holes 45d and 45e are formed in the rear side and the front side of the arm 45a, a guiding pin 72 downward projecting from the gear base 75 being inserted into the guiding hole 45d and a guiding pin 73 upward projecting from the base 32a being inserted into the guiding hole 45e.

A guiding portion 45f is provided at the front end of the link 45, a guiding hole 45g being formed in the guiding portion 45f and a guiding pin 46c, upward projecting from the left end of a link 46, being inserted into the guiding hole 45g. The link 46 comprises an arm 46a, the right end of the arm 46a being rotatably supported on the base 32a by a rotational-axis shaft 46b. An extension 46d is formed at the middle of the link 46, a pressing pin 46e being mounted on the extension 46d, which pin 46e acts on the above-mentioned force generating mechanism 50.

Figure 8:
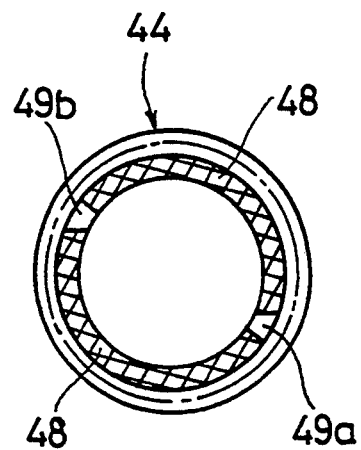
FIG. 8 shows a plan view of a cam used in the mechanism of FIG. 6.
Figure 9:
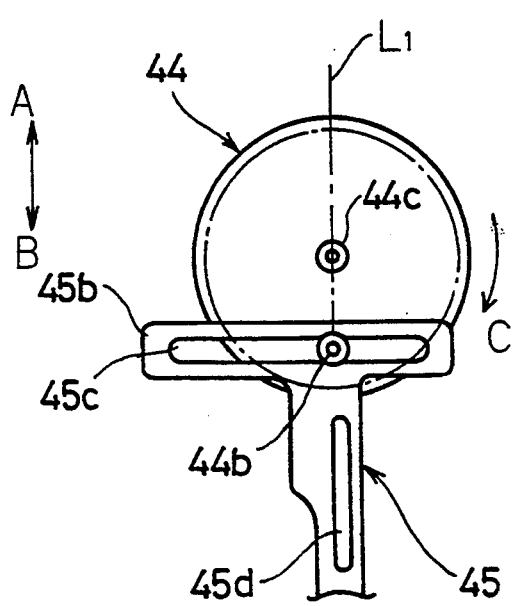
FIG. 9 shows a bottom view of the cam of FIG. 8.

Details of the construction of the top and bottom surfaces of the cam 44 will now be described with reference to FIGS. 8 and 9. As mentioned above, the driving pin 44b, being inserted into the guiding hole 45c of the guiding portion 45b of the link 45, is provided on the bottom surface of the cam 44. FIG. 9 shows a state where the link 45 is located at the frontmost (furthest in the direction B) position in its movement. In this state, the driving pin 44b is located on the line $L_1$ and in front of (the direction B side of) the rotational axis 44c, which line $L_1$ is parallel to the directions A and B and passes through the rotational axis 44c. On the other hand, in a state where the link 45 is located at the rearmost (furthest in the direction A) position in its movement, the driving pin 44b is located on the line $L_1$ in rear of (the direction A side of) the rotational axis 44c.

Thin layers 48 used for a sensor are formed on the top surface of the cam 44, along the circumference thereof, as a result of either being coated or being adhered thereon. Detecting portions 49a and 49b are formed along the extending path of the thin layers 48 at positions diametrically opposing one another, as shown in FIG. 8. The detecting portions 49a and 49b comprise blank areas, along the above extending path of the thin layers 48. The above-mentioned sensor 71 shown in FIG. 7 detects light reflected from the thin layers 49a and 49b so as to determine the current rotational position of the cam 44. Whether the motor 41 shown in FIG. 6 runs or stops is controlled based on the output signal provided by this sensor 71.

Figure 11:
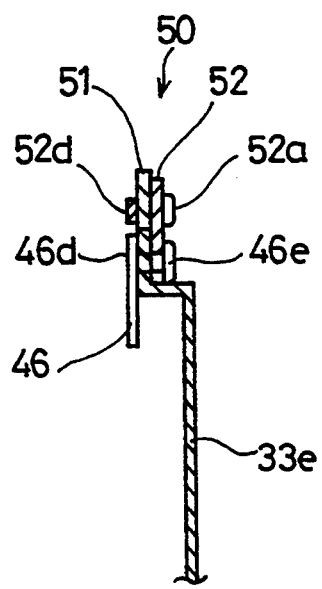
FIG. 11 shows a sectional side elevation view of a construction viewed along a chain line $K_1$-$K_2$ of FIG. 10.
Figure 12:
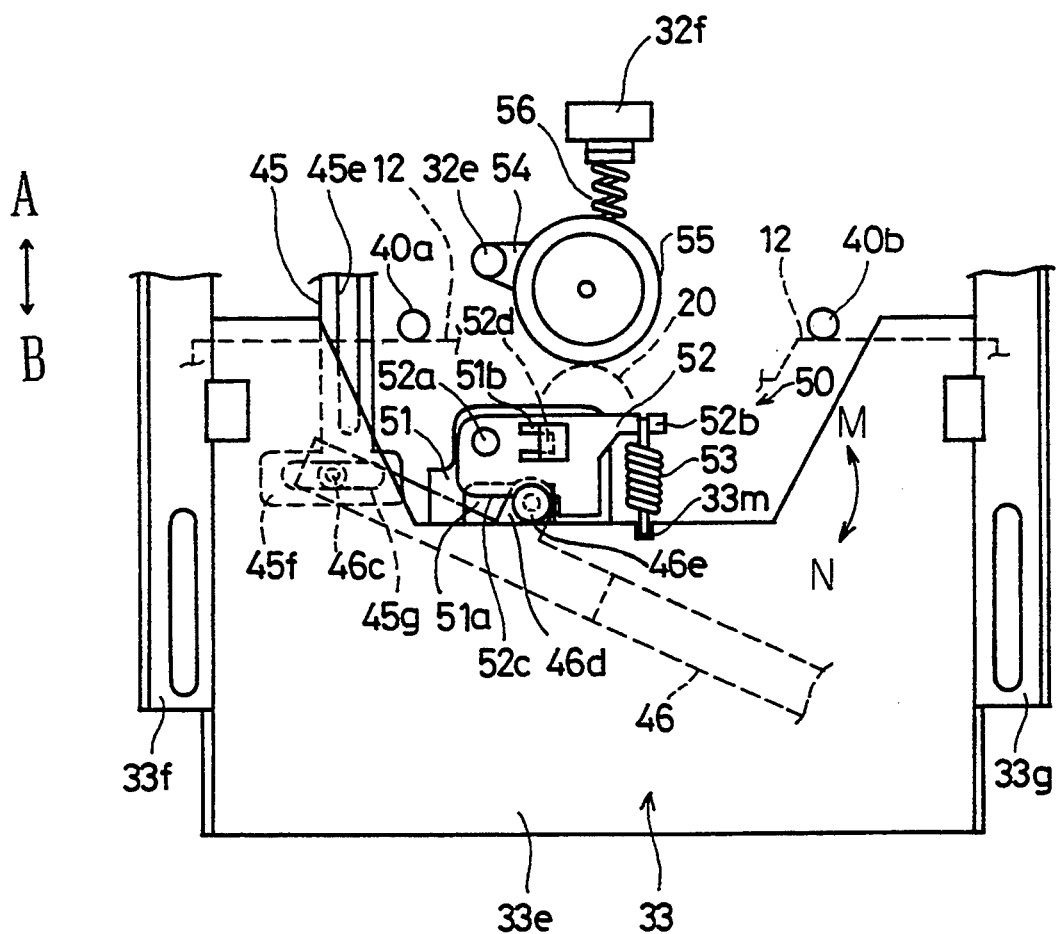
FIG. 12 illustrates a plan view of the force generating mechanism of FIG. 10 at a state where the cassette is loaded in the apparatus of FIG. 4.

The above-mentioned force generating mechanism 50 will be described with reference to FIGS. 10, 11 and 12.

As shown in FIG. 4, the force generating mechanism 50 is provided approximately in middle of front of the bottom plate 33e of the tray 33. The mechanism 50 comprises a fixed base 51, pressure plate 52 and a spring 53. As shown in FIG. 11, the fixed base 51 is integratedly formed on the bottom plate 33e of the tray 33 and the pressure plate 52 is rotatably supported on the fixed plate 51 by the rotational-axis shaft 52a. The ends of the spring 53 are supported, respectively, by a spring supporting portion 52b formed on the pressure plate 52 and a spring supporting portion 33m formed on the tray 33. Thus, the pressure plate 52 is pulled by the spring 53 due to its elastic property along the direction B. Further, a nail 52d formed on the pressure plate 52 passes through a hole 51b formed in the fixed base 51 so as to project downward from the bottom of the fixed base 51.

Figure 10:
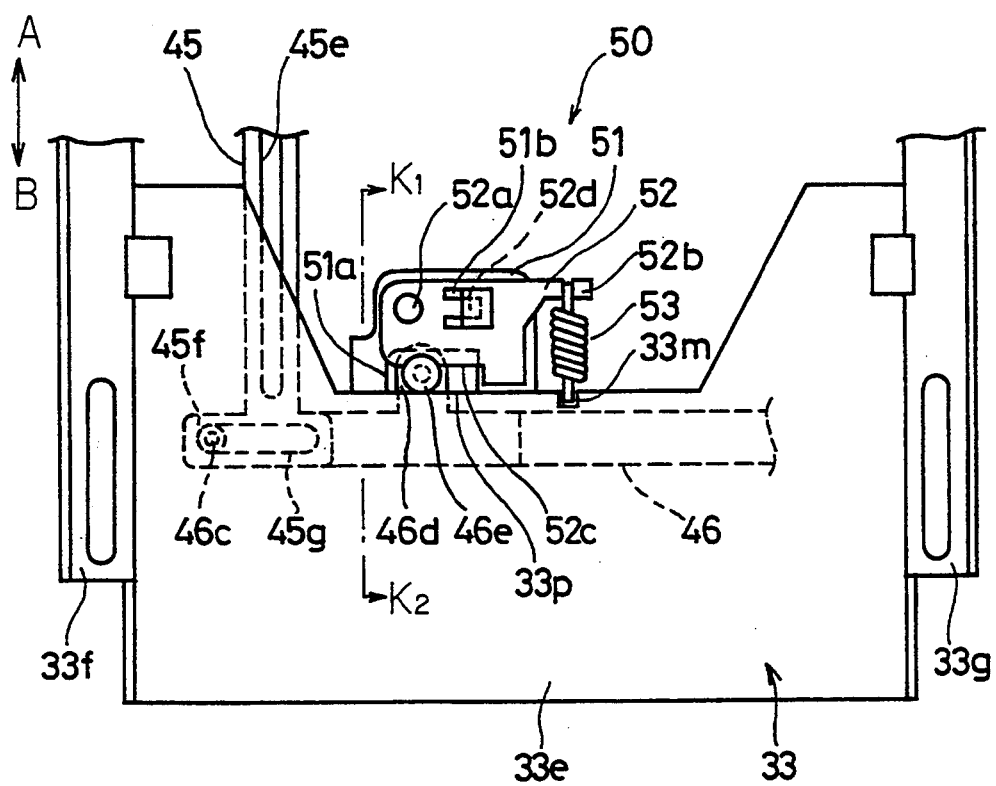
FIG. 10 illustrates a plan view of a force generating mechanism used in the apparatus of FIG. 4.

The above-mentioned pressing pin 46e passes through a hole 51a formed in the fixed base 51 to be sandwiched between and thus supported by an edge 52c of the pressure plate 52 and an edge 33p of the tray 33 as shown in FIG. 10.

A mechanism for locking the cassette 12 will now be described with reference to FIGS. 13A, 13B, 13C, 14A, 14B and 14C. A construction of the hook 35a, opposite to the hook 35b, is similar to that of the hook 35b and thus a description of the hook 35a (given earlier) is omitted here. An operation of the locking mechanism when the cassette 12 is inserted into the tray 33 will now be described. In a state shown in FIG. 13A, the cassette 12 is not in contact with the hook 35b, the hook 35b being in a horizontal state. Then, as the cassette 12 is further inserted into the tray 33, the advancing edge of the cassette 12 comes into contact with the nail $35b_2$ of the hook 35b, as shown in FIG. 13B. By this contact, the hook 35b rotates in the direction H (approximately downward) about the shaft 65b, as shown in FIG. 13B. Then, as the cassette 12 is further inserted into the tray 33, the nail $35b_2$ of the hook 35b is inserted into the locking cutout 19c of the cassette 12, as shown in FIG. 13C.

Since the hook 35b tends to be rotate in the direction G (approximately upward) by means of the spring 66b, the nail $35b_2$ projects into the locking cutout 19c, this locking state between the nail $35b_2$ and the cutout 19c being maintained. Thus, the cassette 12 is firmly held on the tray 33 through the hook 35b (and the hook 35a). Then, the loading of the cassette 12 is achieved by the cassette 12 being moved rearward, the hook 35b (and the hook 35a) thus being positioned at a predetermined position.

Figure 14A:
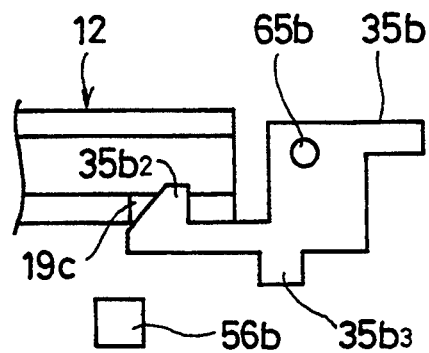
FIGS. 14A, 14B and 14C illustrate the mechanism of FIGS. 13A, 13B and 13C when the cassette is removed from the tray in the apparatus of FIG. 4.

An operation of the locking mechanism when the cassette 12 is removed from the tray 33 will now be described. As a predetermined operation is performed, the tray 33 holding the cassette 12 moves frontward toward the cassette insertion opening 36a (which is exposed as a result of the lid 36 being opened). The state of the nail $35b_2$ of the hook 35b being inserted into the cutout 19c is kept as shown in FIG. 14A while the tray moves as mentioned above.

Figure 14B:
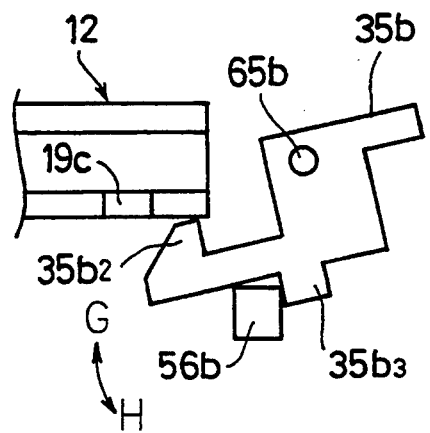
Figure 14C:
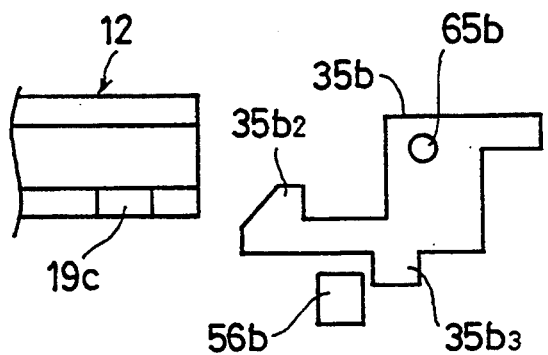

Then, the cassette 12 reaches, as a result of the movement of the tray 33, the position where the cassette 12 had been initially inserted into the tray 33. Then, as shown in FIG. 14B, the projection $35b_3$ comes into contact with the stopper 56b fixed on the body 32. Further frontward movement of the tray 33 causes the hook 35b to move in the same direction, the stopper 56b thus pushing the projection $35b_3$ so as to rotate the hook 35b in the direction H about the shaft 65b as shown in FIG. 14B. As a result of the rotation of the hook 35b, the nail $35b_2$ is removed from the locking cutout 19c of the cassette 12 as shown in FIG. 14B. Then, as the cassette 12 is moved frontward, the engagement between the edge of the cassette 12 and the nail $35b_2$ is completely canceled as shown in FIG. 14C. The complete cancellation of this engagement causes the hook 35b to return to the horizontal state as a result of it being rotated in the direction G by means of the spring 66b.

Figure 15B:
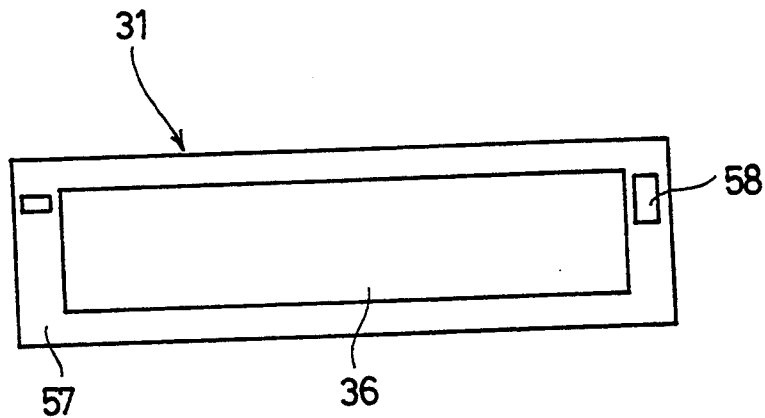

The cassette insertion opening 36a located on the front of the apparatus 31 shown in FIG. 4 will now be described with reference to FIGS. 15A and 15B. The lid 36 is provided on the cassette insertion opening 36a provided on the front bezel 57 of the apparatus 31. The lid 36 is hinged at the bottom thereof, the lid 36 thus opening and closing as a result of rotation of the top thereof. A button 58 for loading/ejection is also provided on the front bezel 57.

Guiding members 60a and 60b are formed on the rear surface of the lid 36, the members 60a and 60b having corresponding curvingly extending elongate holes 61a and 61b formed therein. Pins 62a and 62b, outwardly projecting from the corresponding side walls 33a and 33b, are inserted into the respective elongate holes 61a and 61b. These engagements between the pins 62a and 62b and the corresponding holes 61a and 61b cause the lid 36 to perform the opening and closing operations in response to the positioning of the tray 33.

The operation for loading the cassette in the magnetic writing/reading apparatus 31 will now be described with reference to FIGS. 4, 7, 10 and 12. First, by an operator pressing the loading/ejection button 58, the tray 33 is projected, the lid 36 then being simultaneously opened, by means of the operation of the relevant mechanism of the apparatus 31. The tray 33 is projected to the predetermined position (this position will be referred to as the cassette insertion position, hereinafter) at which the cassette 12 is to be inserted on the tray 33 when the tray 33 is located there. Then, the operator puts the cassette 12 onto the projecting tray 33, the operator further inserting the cassette 12 while fitting the guiding plates 38 and 39 into the guiding grooves 19a and 19b.

The insertion of the cassette 12 causes the top plate 21a of the cassette 12 to come into contact with the above-mentioned cassette-insertion detecting switch 81. As a result, the switch 81 is turned ON. The further insertion of the cassette 12 causes the nails $35a_2$ and $35b_2$ of the hooks 35a and 35b to engage the locking cutouts 19d and 19c as described above.

The cassette 12 is secured onto the tray 33 as a result of being engaged with the hooks 35a and 35b, the top plate 21a of the cassette 12 then coming into contact with the above-mentioned cassette holding detecting switch. As a result, the cassette holding detecting switch is turned ON. The cassette insertion detecting switch 81 and the cassette holding detecting switch being simultaneously in their respective ON states causes the relevant mechanism of the apparatus 31 to function so as to perform the follows operation: The motor 41 starts rotating So as to cause the tray 33 to automatically advance into the apparatus 31 with the cassette 12 held thereon.

The rotation force of the motor 41 shown in FIG. 6 is transferred to the cam 44 through the worm gear 42 and gears 43a–43f, as described above, the cam 44 thus rotating in the direction C. The cassette insertion position of the tray 33 corresponds to the frontmost position (furthest in the direction B) of the link 45 as shown in FIG. 6. At this frontmost position, the driving pin 44b of the cam 44 is located at the position $P_1$ on the straight line $L_1$ passing through the rotational axis 44c and in parallel to the directions A and B. There, tray 33 is in its state of being projected to the cassette insertion position. Then, the cam 44 is rotated in the direction C by the relevant rotation of the motor 41, the rotation of the motor 41. As a result, the driving pin 44b rotates in the direction C from the position P1, the driving pin 44b simultaneously sliding in the guiding hole 45c. This simultaneous rotating and sliding of the driving pin 44b causes the link 45 to move as described below.

The rotation of the driving pin 44b causes the link 45 to move in the direction A, this movement being guided as a result of the guiding pins 72 and 73 being slid in the guiding holes 45d and 45d. The moving of the link 45 in the direction A pulls, along with the guiding hole 45g formed in the link 45, the guiding pin 46c mounted on the link 46 and inserted into the guiding hole 45g. As a result, the link 46 rotates in the direction F while the guiding pin 46c slides in the guiding hole 45g. As a result, the pressing pin 46e provided on the link 46 rotates in the direction F about the rotational axis shaft 46b as shown in FIG. 12.

The pressing pin 46e of the link 46 rotating in the direction F presses the edge 52c of the pressure plate 52 in the direction A. The pressing of the edge 52c of the pressure plate 52 causes the plate 52 to move to causes the tray 33 to move in the direction A so as to advance, the spring 53 not being extended and the pressure plate 52 being maintained in a nonrotating state at this time.

Figure 2A:
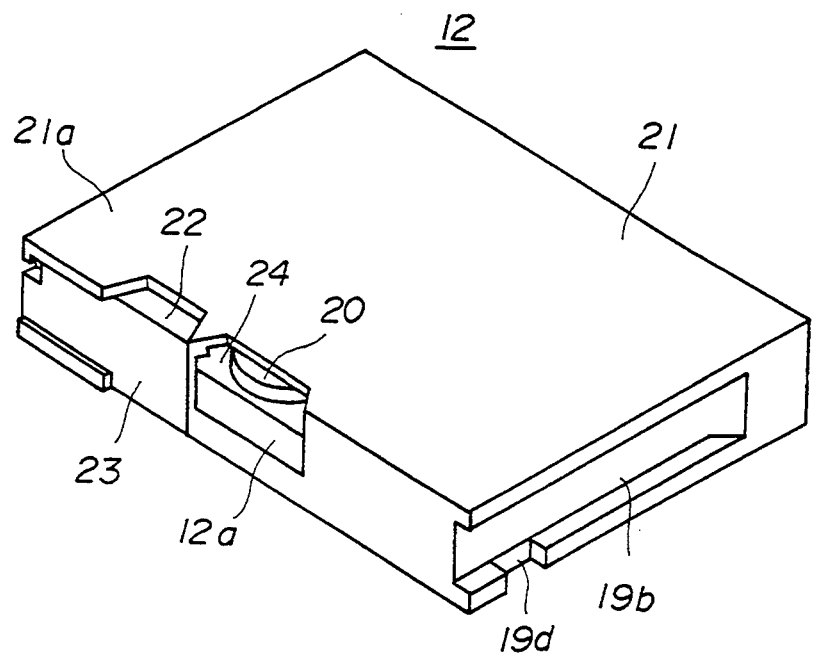
FIGS. 2A and 2B show perspective views of a tape cassette may be applied to the arrangement of FIG. 1 and also may be applied to the arrangement according to the present invention.
Figure 2B:
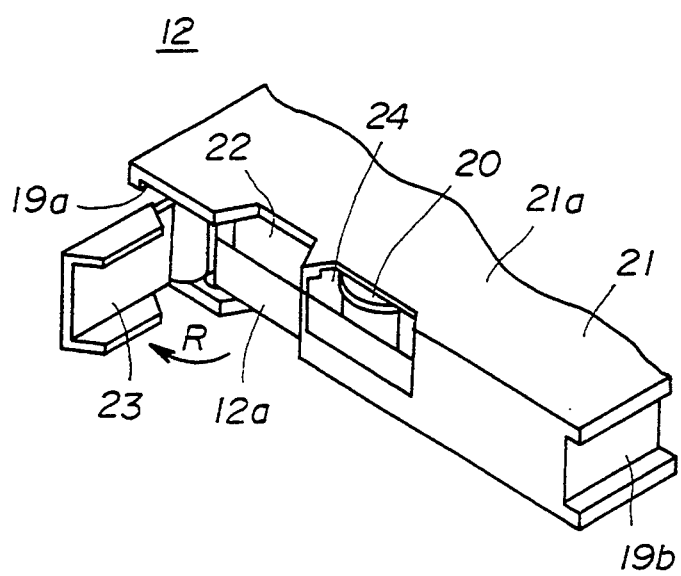
Figure 3A:
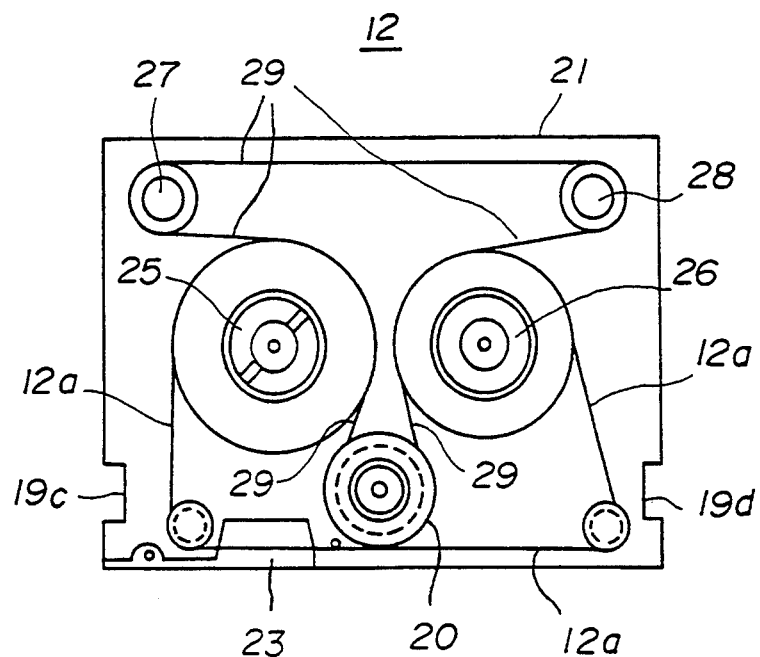
FIGS. 3A and 3B show, respectively, an internal plan view and a front view of the tape cassette of FIGS. 2A and 2B.
Figure 3B:
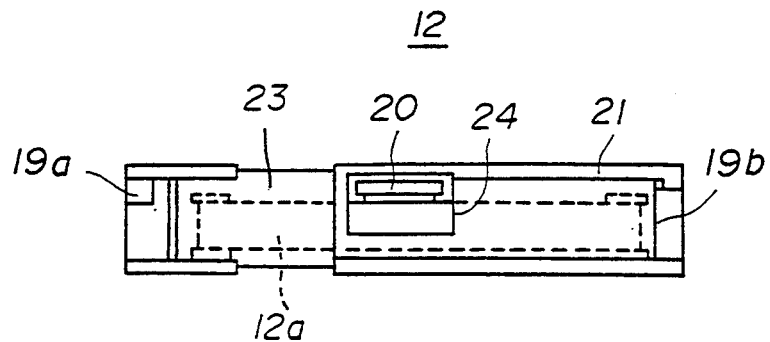

The movement of the tape cassette 12 held by the thus advancing tray 33 in the direction A a certain distance causes the driving roller 20 provided at the front of the cassette 12 as shown in FIG. 2A to come into contact with the idler roller 55 of the apparatus 31. Subsequently, the tray 33 moves slightly further in the direction A and the cassette 12 held by the thus moving tray 33 as a result also moves in the direction A accordingly. As a result, as shown in FIG. 12, the driving roller 20 of the cassette 12 presses the idler roller 55, the idler roller 55 as a result moving in the direction A so as to press against the spring 56 to compress it. The compressing of the spring 56 generates the elastic force thereof for restoring the shape thereof so that the spring presses the idler roller 55 in the direction B. As a result, the advancing (front) edge of the cassette 12 comes into contact with the stoppers (pins) 40a and 40b, the stoppers 40a and 40b preventing the further A-directional movement of the tray 33. FIG. 12 shows the state where the stoppers 40a and 40b have stopped the movement of the tray 33.

Then, the cam 44 rotates slightly further rotates in the direction C so that the driving pin 44b arrives at the position $P_2$ shown in FIG. 6, this arriving of the driving pin 44b at the position $P_2$ being detected as a result of the detecting portion 49b being detected by the sensor 71, this detection causing the apparatus 31 to control and then make the motor be stopped.

As mentioned above, the cam 44 rotates further in the direction C even after the A-directional movement of the cassette 12 is stopped as a result of the advancing edge of the cassette 12 coming into contact with the stoppers 40a and 40b. Thus, the pressing pin 46e of the link 46 moves in the direction A so as to press the pressure plate 52 in the same direction even after movement of the fixed plate 51 together with the tray 33 has been prevented. As a result, the pressure plate 52, then rotating in the direction M shown in FIG. 12 about the rotational axis 52a, pulls, in the direction A, the spring 53 with the spring supporting portion 52b. The thus pulled spring 53 as a result extends so as to generate its elastic force which pulls the tray 33 in the direction A with the supporting portion 33m. This generated pulling force is added to the force generated by the coil springs 67a and 67b, the resulting force cooperatively causing the tray 33 to be pressed in the direction A. As a result, the cassette 12 held by the thus pressed tray 33 is pressed against the stoppers 40a and 40b further, with the result that the cassette 12 is firmly held in the loaded position.

In-manufacturing dimensional errors may appear in the cassette 12 and/or the tray 33, which errors may minimize the above-mentioned rotation in the direction M of the pressure plate 52. The position $P_2$ is previously set so that the spring 53 applies a sufficient elastic force to the tray 33 so that the cassette 12 is firmly held in the loaded position even if the in-manufacturing dimensional errors minimize the rotation in the direction of the pressure plate 52. At the position $P_2$ the driving pin 44b stops rotating in response to the detection by means of the sensor 71 mentioned above. As a result, regardless of whether the in-manufacturing dimensional errors appear in the cassette 12 and/or tray 33, the cassette 12 can be maintained in the state where the advancing edge thereof is sufficiently pressed against the stoppers 40a and 40b so that the cassette is always firmly held in the loaded position if necessary. Thus, the driving roller 20 is pressed against the idler roller 55 with a sufficient pressing force.

The advantage resulting from the provision of the force generating mechanism 50 will now be described again from another view point. In a case where the tray 33 is made to advance to the predetermined loaded position without provision of such a mechanism in the apparatus 31, the following problem might occur: It is not possible to press the cassette 12 against the stoppers 40a and 40b sufficiently so that the driving roller 20 cannot be pressed against the idler roller 55 with a sufficient pressing force. Such a possibility, as only insufficient pressing force being applied between the rollers 20 and 55, may arise due to in-manufacturing dimensional errors in the cassette 12 and/or the tray 33. As a result, running of the magnetic tape 12a might be unstable due to insufficient transfer of force from the idler roller 55 to the driving roller 20 which drives the reels 25 and 26 as mentioned above and as shown in FIG. 3A. The stable running of the magnetic tape 12a of the cassette 12 can be achieved by the provision of the force generating mechanism 50 as mentioned above, which results in the provision of a pressing force sufficient to press the driving roller 20 against the idler roller 55.

Further, in the present embodiment, the driving pin 44b is located at the position P2 on the straight line L1 passing through the rotational axis 44c and in parallel to the directions A and B when the driving pin 44b stops rotating due to the driving pin 44b having arrived at the predetermined position, which arrival, as mentioned above, is detected by means of the sensor 71. This spatial arrangement of the driving pin 44b and the cam 44 acts to prevent the cam 44 from undesirably rotating due to the link 45 pulling the driving pin 44b in the direction B.

The spring 53 may comprise a small one because the necessary pressing force with which the cassette 12 is pressed against the stoppers 40a and 40b is generated not only by the pulling force of the spring 53 but also by the pulling force of the coil springs 67a and 67b.

After the cassette 12 has been thus completely loaded in the apparatus 31 as described above, as shown in FIG. 15A, the guiding portions 60a and 60b mounted on the lid 36 are guided by the respective pins 62a and 62b provided on the tray 33 so that the lid 36 closes the cassette insertion opening 36a.

Operations for ejecting the thus loaded cassette 12 will now be described. The operator pressing the loading/ejection button 58 causes the motor 41 to rotate in the direction C, the cam 44 then rotating through the above-mentioned intermittent gears accordingly as shown in FIG. 6. As a result, the driving pin 44b of the cam 44 rotates in the direction C away from the position P2, the link 45 thus moving in the direction B as it is driven by the driving pin 44b. As a result, the link 48 rotates in the direction E, the pressing pin 46e of the link 46 as a result pressing the edge 33p of the tray 33 in the direction B. This pressing of the edge 33p causes the tray 33 to also move in the B direction so that the tray 33 arrives at the above-mentioned cassette insertion position. This arriving of the tray 33 is detected as a result of the detection portion 49a of the cam 44 shown in FIG. 8 being detected by the sensor 71. The apparatus 31 then stops the motor 41 due to the above detection by means of the sensor 71.

As shown in FIG. 6, the driving pin 44b of the cam 44 is at the position P1 on the straight line L1 passing through the rotational axis 44c when the cam 44 stops rotating due to stopping of the motor 41. This spatial arrangement of the driving pin 44b and the cam 44 acts to prevent the cam 44 from undesirably rotating due to the link 45 pulling the driving pin 44b in the direction A.

After the cassette 12 has been reached the cassette insertion position as mentioned above, as shown in FIG. 15A, the guiding portions 60a and 60b mounted on the lid 36 are guided by the respective pins 62a and 62b provided on the tray 33 so that the lid 38 of the cassette insertion opening 36a is opened. Thus, it becomes possible to remove the cassette 12 from the tray 33.

The apparatus 31 has an arrangement by which the cassette 12, in the state where it is removable from the tray 33, may be again loaded in the apparatus 31 by pressing the button 58. The pressing of the button 58 by the operator causes the cassette 12 to advance together with the tray 33 so that the cassette 12 is loaded as mentioned above.

The loading mechanism 34 provided in the present embodiment achieves the automatic loading/ejection, using the motor 41, of the cassette 12 into/from the apparatus 31. Such an automatic loading/ejecting function substantially eliminates the need for a force to be applied by an operator to the apparatus 31 or the cassette 12 in the relevant operation.

Further, the cassette insertion opening 36a is closed by the lid 36 when the cassette 12 is completely loaded in the apparatus 31. This closing of the insertion opening 36a by the lid 36 prevents the loaded cassette 12 from being exposed to the outside and thus prevents the cassette 12, which is undergoing the data writing/reading operation, from being erroneously ejected. Further, the lid 36 acts to prevent the loaded cassette 12 from being contaminated by external dust.

Further, the running/stopping control of the motor 41 for the loading/unloading operation is performed based on detection of the rotational angle of the cam 44 by means of the sensor 71. Application of such a way of control in the control of the motor 41 enables the number of components required for the control to be less than that required for the control in the case where components such as the microswitch (tradename) as mentioned above are used. As a result, cost of the apparatus may be reduced.

Further, the present invention is not limited to the above described embodiments, and variations and modifications may be made without departing from the scope of the present invention.

What is claimed is:

1. A magnetic writing/reading apparatus comprising:
   a holder for holding a cassette containing a magnetic tape, said cassette being set in said holder;
   locking means for locking said cassette in said holder when said cassette is to be loaded in said magnetic writing/reading apparatus, said locking means being released when said cassette is to be ejected from said magnetic writing/reading apparatus;
   carrying means for automatically carrying said holder holding said cassette so that said cassette is loaded in said magnetic writing/reading apparatus, said carrying means which automatically carries said holder holding said cassette causing said holder to be returned to a position at which said cassette has been initially set in said holder; and force generating means provided in said holder for generating a force while said cassette is loaded in said magnetic writing/reading apparatus, said generated force then being applied to said cassette appropriately so that maintenance of the loading state of said cassette is ensured and also a suitable writing/reading operation using said magnetic tape in said magnetic writing/reading apparatus is ensured.

2. The magnetic writing/reading apparatus according to claim 1, wherein said force generating means comprises:

an engagement portion provided on said carrying means;

a rotating member rotatably supported on said holder and being rotated as a result of being pressed by said engagement portion; and an elastic member connecting said holder to said rotating member; and wherein:

said carrying means causes said engagement portion to press said rotating member while said cassette is loaded in said magnetic writing/reading apparatus;

said rotating member accordingly being rotated so as to cause said elastic member to apply a force to said holder;

said force applied to said holder causing a force to be appropriately applied to said cassette, said cassette having been locked in said holder by means of said locking means.

3. The magnetic writing/reading apparatus according to claim 1, further comprising a lid for covering an opening formed in said magnetic writing/reading apparatus, said cassette being inserted through said opening, said opening being exposed when said lid is opened, the closing and opening actions being performed in response to the movement of said holder driven by means of said carrying means.

4. The magnetic writing/reading apparatus according to claim 1, wherein:

said cassette contains reels on which said magnetic tape is wound; and said magnetic writing/reading apparatus further comprises driving means for driving said magnetic tape by rotating said reels so that said magnetic writing/reading apparatus may access arbitrary part of said magnetic tape; and wherein said force generating means ensures said driving means drive said reels wheel said cassette is loaded in said magnetic writing/reading apparatus.

5. The magnetic writing/reading apparatus according to claim 4, wherein:

said cassette-further contains a driving roller which is linked with said reels through a driving belt and is rotated by means of said driving means of said magnetic writing/reading apparatus, the resulting rotation of said driving roller causing said reels to rotate accordingly via said driving belt; and said driving means of said magnetic writing/reading apparatus comprises a driving roller which, while said cassette is loaded in said magnetic writing/reading apparatus, comes in contact with said driving roller of said cassette so as to transfer a rotating force so that said driving roller of said driving means drives said driving roller of said cassette; and wherein, while said cassette is loaded in said magnetic writing/reading apparatus, said force generating means causes said driving roller of said driving means of said magnetic writing/reading apparatus and said driving roller of said cassette to be pressed against one another so that transferring of the rotating force of said driving roller of driving means to said driving roller of said cassette is ensured.

6. The magnetic writing/reading apparatus according to claim 1, wherein said carrying means comprises:

a first link for carrying said holder;

a second link for applying appropriate force to said force generating means;

driving means for driving said first link and said second link so that said first link and said second link execute relevant operations; and driving gears for providing a connection between said first link and said driving means.

* * * * *